US009924550B2

(12) United States Patent
Reynaud et al.

(10) Patent No.: US 9,924,550 B2
(45) Date of Patent: Mar. 20, 2018

(54) DYNAMIC LTE NETWORK

(71) Applicant: ORANGE, Paris (FR)

(72) Inventors: Laurent Reynaud, Trevou-Treguignec (FR); Karina Gomez Chavez, Trento (IT); Tinku Mohamed-Rasheed, Trento (IT)

(73) Assignee: Orange, Paris (FR)

( * ) Notice: Subject to any disclaimer, the term of this patent is extended or adjusted under 35 U.S.C. 154(b) by 7 days.

(21) Appl. No.: 14/764,857

(22) PCT Filed: Jan. 29, 2014

(86) PCT No.: PCT/FR2014/050156
§ 371 (c)(1),
(2) Date: Jul. 30, 2015

(87) PCT Pub. No.: WO2014/118463
PCT Pub. Date: Aug. 7, 2014

(65) Prior Publication Data
US 2015/0359020 A1 Dec. 10, 2015

(30) Foreign Application Priority Data

Jan. 30, 2013 (FR) ...................... 13 50780

(51) Int. Cl.
*H04W 76/02* (2009.01)
*H04W 40/28* (2009.01)
(Continued)

(52) U.S. Cl.
CPC ...... *H04W 76/022* (2013.01); *H04B 7/18504* (2013.01); *H04L 12/4633* (2013.01);
(Continued)

(58) Field of Classification Search
CPC ..... H04W 92/20; H04W 16/32; H04W 24/10; H04W 36/30; H04W 72/042; H04W 76/025
See application file for complete search history.

(56) References Cited

U.S. PATENT DOCUMENTS

2010/0093359 A1    4/2010  Gallagher et al.
2013/0136078 A1*   5/2013  Bucknell ............... H04W 28/06
                                                         370/329
(Continued)

FOREIGN PATENT DOCUMENTS

WO    2012/070044 A1    5/2012

OTHER PUBLICATIONS

Sebastian Rohde et al., "AVIGLE: A System of Systems Concept for an Avionic Digital Service Platform Based on Micro Unmanned Aerial Vehicles," Systems Man and Cybernetics (SMC), IEEE International Conference, Oct. 10, 2010, pp. 459-466, XP031805717.

(Continued)

*Primary Examiner* — Jung Park
(74) *Attorney, Agent, or Firm* — Baker Hostetler LLP

(57) ABSTRACT

A communication network comprises a packet core network and at least one wireless access node, arranged to provide the core network with access to user equipment via a first interface established between the access node and a network element of the core network. The network comprises at least one management entity configured to establish a virtual second interface passing through it and linking the access node and the network element and in which the first interface is encapsulated.

15 Claims, 9 Drawing Sheets

(51) Int. Cl.

| | |
|---|---|
| *H04W 40/24* | (2009.01) |
| *H04W 4/02* | (2018.01) |
| *H04L 12/46* | (2006.01) |
| *H04B 7/185* | (2006.01) |
| *H04W 24/04* | (2009.01) |
| *H04W 92/20* | (2009.01) |

(52) U.S. Cl.
CPC ............ *H04W 4/021* (2013.01); *H04W 24/04* (2013.01); *H04W 40/248* (2013.01); *H04W 40/28* (2013.01); *H04W 76/027* (2013.01); *H04W 92/20* (2013.01)

(56) References Cited

U.S. PATENT DOCUMENTS

2013/0294403 A1* 11/2013 Srinivasan .......... H04W 36/165
370/331
2014/0022904 A1* 1/2014 Ahmad ............. H04W 28/0289
370/235
2014/0036722 A1* 2/2014 Giloh ................. H04L 12/4633
370/254

OTHER PUBLICATIONS

Daniel T. Fokum et al., "A Survey on Methods for Broadband Internet Access on Trains," IEEE Communications Surveys, vol. 12, No. 2, Apr. 1, 2010, pp. 171-185, XP011334499.

* cited by examiner

DYNAMIC LTE NETWORK

CROSS-REFERENCE TO RELATED APPLICATIONS

This application is a National Stage of International patent application PCT/FR2014/050156, filed on Jan. 29, 2014, which claims priority to foreign French patent application No. Fr 1350780, filed on Jan. 30, 2013, the disclosures of which are incorporated by reference in their entirety.

TECHNICAL FIELD

The present invention relates generally to telecommunication networks and in particular to a wireless communication network.

PRIOR ART AND TECHNICAL ISSUE

The LTE (Long Term Evolution) technology denotes a wireless communication standard, called fourth generation, designed to allow data transmission in packet mode at a very high bit rate.

The 4G networks based on the LTE technology make it possible to bring the high mobile bit rate closer to the world mass market by virtue of the major advances in user experience and the existence of a single world standard.

LTE 4G/3GPP is a mobile communication technology standard and corresponds to an evolution of the GSM/UMTS (Global System for Mobile communication/Universal Mobile Telecommunication System) standards. The LTE standard has been developed to increase the capacity of the mobile networks using new signal processing techniques and new modulation techniques. The LTE standard has also been designed with a view to simplifying and modifying the architecture of the network as a system based on IP (Internet Protocol), while significantly reducing the transfer times by comparison to the 3G architecture.

The architecture of a communication network according to the LTE technology is defined by a set of technical specifications created by the 3GPP organization. Specification TS 36.300, entitled "Evolved Universal Terrestrial Radio Access (E-UTRA) and Evolved Universal Terrestrial Radio Access Network (E-UTRAN); Overall description; Stage 2" defines the architecture of the access network.

FIG. 1 illustrates the architecture of a conventional LTE network. As represented in FIG. 1, an LTE communication network is based on an IP-based network architecture 100, comprising a packet core network 20 called EPC (Evolved Packet Core).

Conventionally, the LTE network comprises:
- a plurality of antennas-relays or nodes 10 called, in LTE, "eNodeB" or eNB;
- a mobility management entity 11 called, in LTE, "Mobility Management Entity" or MME;
- a serving gateway 12, called, in LTE, "Serving Gateway" or S-GW;
- a gateway 13 to external networks 18 called, in LTE, "Packet Data Network Gateway" or PDN GW;
- a central subscriber database 14 called, in LTE, "Home Subscriber Server" or HSS;
- a charging rules module 15 called, in LTE, "Policy and Charging Rules Function" or PCRF.

Each node eNB 10 is responsible for radio transmission and reception with a user equipment item 16 (usually designated by the acronym "UE"). Each node eNB is a unique node which communicates with a user equipment item. The user equipment 16 can be mobile. The mobility management entity MME 11 is the main management element for access to the LTE network. It is responsible for all the procedures (authentication, encryption, signaling, mobility, etc.) relative to the user equipment 16.

The serving gateway S-GW 12 routes and locally transfers the data packets to the user, and allows the connection between the LTE networks and other 3GPP networks.

When disasters of natural origin or emergency situations occur, failures of the telecommunications infrastructure are commonplace. These failures can be linked:
- to the physical destruction of network components: this type of failure is widely reported and documented for recent disasters. The problems caused by such physical destruction are often more severe and more lasting than the problems linked to network disruption and congestion. The occurrence of this type of failure generally requires the repairing or the replacement of the damaged system in the network, which can be a lengthy and particularly difficult process in a disaster situation, for which access to the failing equipment can be greatly complicated by other factors caused by said disaster;
- to a disruption of the network support infrastructure: the telecommunication networks depend on numerous other local and regional technical systems in order to ensure their correct operation. For example, in the case of the cellular networks, the use of an eNB is greatly dependent on the use of the packet core network EPC. Another important factor relates to the electricity distribution systems, which represent the most important support infrastructure for the telecommunication networks. If the electricity distribution systems suffer damage, the backup electrical mechanisms, when they exist, can power the network only for a limited time;
- to disruptions due to congestion of the network: these days, social networks are widely used media. In a catastrophe case, the crisis which results therefrom generates an intense need for communication and coordinated response activities, as well as numerous exchanges to convey information concerning the affected groups and individuals. Thus, the telecommunication traffic increases significantly during a disaster and emergency situations. The result thereof is an overloading of the network, causing calls to be rejected and blocked and messages to be lost;
- in the particular case of remote regions: when catastrophes and emergency situations occur in remote areas where the telecommunications infrastructures do not exist, the rescue activities can become a challenge because of the communication difficulties between the different groups.

These events generally induce significant traffic. Upon the occurrence of such events, the existing solutions do not make it possible to deploy LTE networks to allow access to emergency communication means, nor do they make it possible to temporarily increase capacity for the LTE networks in a reliable manner.

GENERAL DEFINITION OF THE INVENTION

To this end, the invention proposes a communication network comprising a packet core network and at least one wireless access node, arranged to provide the core network with access to user equipment via a first interface established between the access node and a network element of the core network. Advantageously, the network comprises at least one management entity configured to establish a virtual second interface passing through it and linking the access node and the network element and in which the first interface is encapsulated.

The invention thus makes it possible to recognize the mobility of the access nodes eNBs by means of additional hardware elements, involving support of new communication interfaces in the associated equipment between the eNBs and the core network EPC, and software elements. The new software entities proposed are based in particular on a virtualization approach which constitutes an effective solution for satisfying the requirements of the dynamic model for the LTE communication networks, while having a relatively small impact on the existing architecture supported by the LTE standard.

In one embodiment of the invention, the communication network comprises a management entity in the core network and a client management entity in each access node. The client management entities of the access nodes can thus take over the process making it possible to switch from the LTE technology to any technology used for the communication between the access nodes and the core network EPC, while the management entity of the core network takes over the capabilities of the access nodes in a centralized manner.

In particular, the activation of the virtual second interface comprises the encapsulation of the message in a packet by the management entity of the access node, and the transmission of the packet to the management entity of the core network according to a determined route, the packet being intercepted and returned by each management entity of the intermediate access nodes on the route, which makes it possible to route information between the access nodes eNBs and for several eNBs to be connected through the interfaces, in the emergency situations.

In addition, the management entity can comprise a metrics repository suitable for storing metrics for each access node in the network and for updating them by means of exchanges between the access nodes. The network information for the operation of the management entity can thus be maintained.

According to one feature of the invention, the management entity can comprise a routing management entity configured to determine a route for each message exchanged between an access node and the network element, which makes it possible to control the routing and the tracking for the network of the access nodes eNBs.

The management entity can further comprise a topology management entity arranged to control the topology of the network. The recognition of the network topology by the management entity or entities ensures a mobility of the access nodes and a management of the topology of the access nodes that is dynamic and coordinated.

According to another feature of the invention, the management entity can comprise a link management entity configured to control the MAC and physical layers (PHY) of the supported interfaces to communicate with the core network, and to encapsulate/de-encapsulate the messages exchanged between the access node and the network element. The link management entity notably makes it possible to maintain a direct dynamic link between the access node eNB and the core network EPC, to virtualize the first interface S1 and to maintain the virtual second interface.

Advantageously, the link management entity can comprise a disruption management agent for controlling the service disruptions and the disconnections, the disruption management agent being configured to store in memory packets incoming into an access node, selected according to predefined rules, the disruption management agent further being suitable, in response for the re-establishment of the link between an access node and a network element following a network service disruption or disconnection, for sending some of the packets stored in memory to the network element. The invention thus makes it possible to support the DTN (Delay/Disruption Tolerant Networks) mechanisms and the autonomous mechanisms for avoiding the loss of information and the disruption of services.

The link management entity can also comprise a core network agent suitable for at least partially replacing an element of the core network, in case of unavailability of the element of the core network following disruptions or disconnections. This core network agent makes it possible to control the temporal disruptions that can affect the virtual second interface.

The invention further proposes a wireless access node having a given coverage area, arranged to provide access to user equipment located in the coverage area. The access node is able to move and comprises a management entity configured to establish a link between the mobile access node and an element of a communication network via a first interface established between the access node and the network element. The FME management entity is further configured to establish a virtual second interface passing through it and linking the access node and the network element, and in which the first interface is encapsulated. Such an access node is suitable for a multiple-interface and dynamic connection to the core network 200.

The network element can be an element of the packet core network of the communication network, such as the entity MME or the gateway S-GW.

In one embodiment of the invention, the access node can be an isolated node and the network element is another access node isolated from the communication network, which makes it possible to maintain partial services in the scenarios in which access nodes are isolated from the core network for an indeterminate time due to the fragmentation of the network.

The access node can comprise a multiple-interface module configured to allow communication between the access node and the core network of the communication network, according to a suitable technology.

Each access node may further comprise a mobility module configured to provide the positions of the mobile node according to a suitable locating technology. The access nodes can thus be mobile, and deployed dynamically in emergency situations.

The invention also proposes a method for the deployment of a communication network, in a given coverage area, comprising a packet core network and at least one wireless access node, arranged to provide the core network with access to user equipment of the coverage area via a first interface established between the access node and a network element of the core network. The method comprises the steps consisting in:
  providing at least one management entity in the network;
  activating the link between the core network and the wireless access node according to the topology of the network;
  creating a virtual second interface passing through the management entity, linking the access node and the network element, and in which the first interface is encapsulated.

Such a method makes it possible to implement scenarios for dynamic deployments of the access nodes, in emergency situations.

BRIEF DESCRIPTION OF THE DRAWINGS

Other features and advantages of the invention will become apparent on reading the following detailed description and the figures of the attached drawings in which.

DETAILED DESCRIPTION

Figure 1:
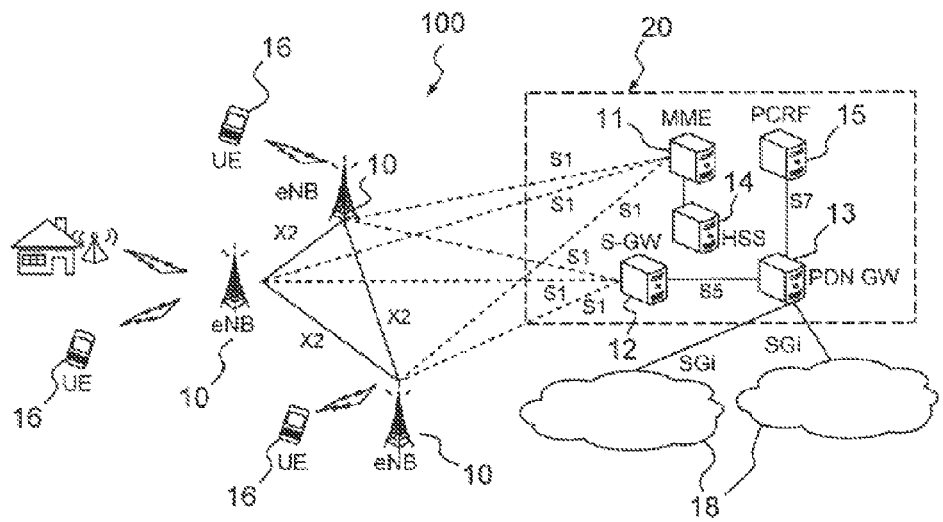
FIG. 1 is an exemplary conventional LTE architecture.
Figure 2:
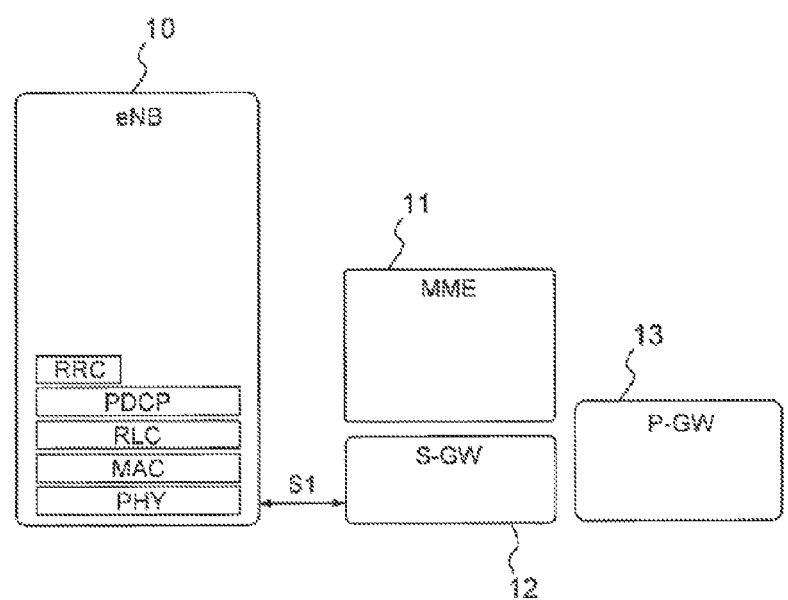
FIG. 2 is a structural view of the main elements of the conventional LTE network.

Although a person skilled in the art is assumed familiar with the LTE networks, certain concepts are reviewed here in relation to FIGS. 1 and 2 to assist in understanding the invention.

The LTE architecture 100 of FIG. 1 shows the interactions between the nodes eNB 10 and the core network EPC 20.

The main interfaces supported in an LTE network comprise:

an interface S1-C which is the reference point for the control plane protocol between E-UTRAN and the entity MME 11;

an interface S1-U in the transport plane which transports the user data between the eNodeB and the Serving GW 12;

an interface S5 between the gateway S-GW 12 and PDN-GW 13, used to reallocate the eNBs following the mobility of a user equipment item 16 and when the gateway S-GW 12 needs to connect to a gateway PDN GW 13 for PDN connectivity;

an interface S6a which makes it possible to transfer subscription and authentication data to authenticate/authorize access of a user to an evolved system (interface AAA, standing for "Authentication Authorization Accounting") between the entity MME 11 and the HSS database;

an interface SGi which is the reference point between the gateway PDN GW 13 and the packet data network 18. The packet data network 18 can be the external public network of an operator or a private packet data network or even an intra-operator packet data network such as, for example, a network for providing IMS ("IP Multimedia Subsystem") services. This reference point corresponds to the interface Gi for 3GPP network access;

an interface X2 used to interconnect the eNBs 10.

FIG. 2 illustrates the distribution of the functions between a node eNB 10 and the elements of the core network EPC 200.

Each node eNB 10 implements MAC (Media Access Control), physical (PHY), RLC (Radio Link Control) and PDCP (Packet Data Control Protocol) layers, and offers radio resource control (RRC), admission, QoS (Quality of Service), and other such functionalities. An eNodeB 10 has the interface S1 with the core network EPC 20. The interface S1 comprises the interface S1-C in the control plane and the interface S1-U in the transfer plane.

Furthermore, the adjacent eNBs use the interface X2 between them, which makes it possible to minimize the loss of packets in the mobility of the user in ACTIVE ("handover") mode. When a user provided with an equipment item UE 16 moves in ACTIVE mode from a first eNB to a second eNB, new resources are allocated on the second eNB for the UE 16. However, the core network 20 continues to transfer the packets intended for the UE 16 to the first eNB until the second eNB has informed the network of the change. In this transitional period, the first eNB relays the packets intended for the UE 16 over the interface X2 to the second eNB which forwards them to the UE 16.

More dynamic scenarios for deployment of the eNBs, notably to ensure the safety of the public or even emergency communications, make it necessary to allow mobility of the eNBs 10 and manage a dynamic and coordinated eNB topology. Moreover, the network operation during such scenarios requires a routing of information between the eNBs and a connection of several eNBs through the interfaces S1.

Thus, the introduction of a dynamic topology into 4G/3GPP LTE poses the problem of the cooperation of the eNBs 10 to deal with the problems relating to the needs of the scenarios, like the mobility of the eNBs and the connection disruptions between eNBs.

To this end, the invention proposes a novel LTE component, hereinafter called Mobility Management Entity of the eNBs, or FME ("Flexibility Management Entity"). The entity FME according to the invention allows effective cooperation of the eNBs without overturning the architecture of the standard access network and the rules of the LTE network infrastructure. It further makes it possible to introduce these new functions, while limiting the modifications made to the architecture of the LTE network.

Figure 3:
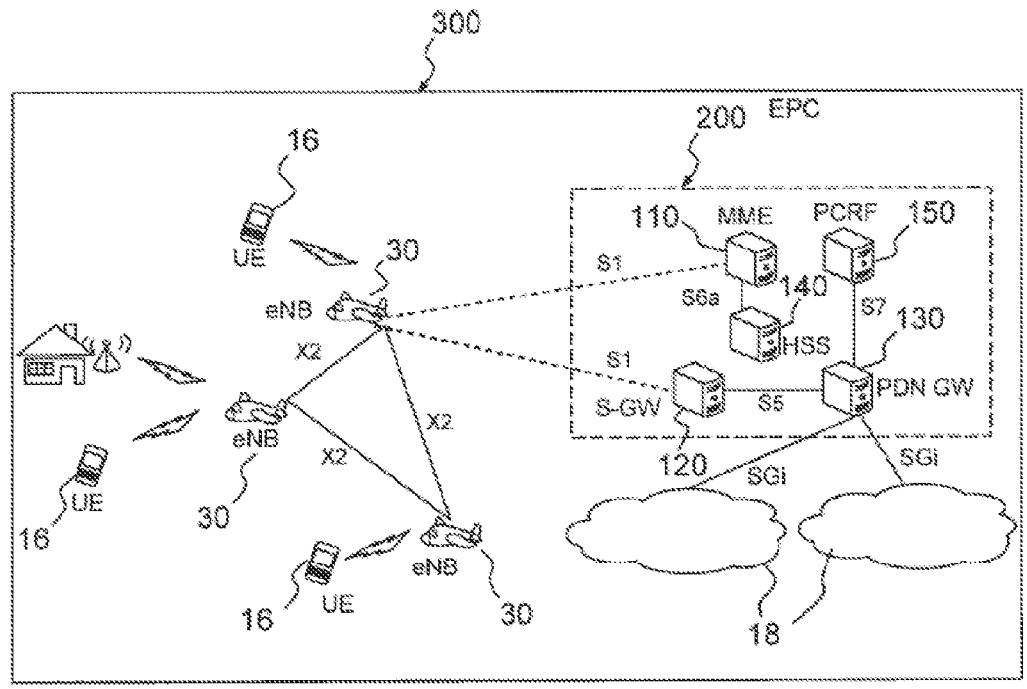
FIG. 3 represents an exemplary dynamic LTE architecture according to one embodiment of the invention.

FIG. 3 represents an exemplary LTE 300 architecture, according to one embodiment of the invention, which makes it possible to support the mobility of nodes eNBs 30. In this example, only some of the nodes eNB are connected to the core network EPC 200. This diagram shows that the dynamic LTE 300 architecture constitutes a dynamic environment in which a subset of mobile nodes eNBs 30 in the network manages the communications with the core network 200 in order to maintain the services provided by the core network 200 in the LTE network.

In a particular embodiment, these nodes eNB, also hereinafter called "Het.eNB", are adapted to allow a multiple-interface connection to the core network 200 and are called heterogeneous.

Figure 4:
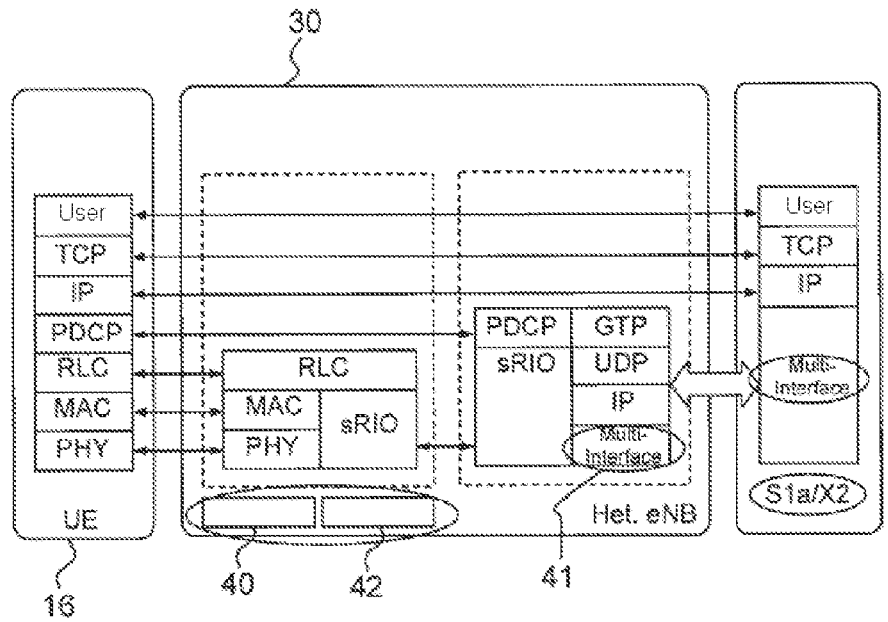
FIG. 4 shows the architecture of a node eNodeB according to one embodiment of the invention.

FIG. 4 shows the structure of a heterogeneous node Het.eNB 30 according to the invention. A heterogeneous node Het.eNB 30 advantageously has the following features which distinguish it from a conventional node eNB:

- a heterogeneous node Het.eNB has an autonomous power supply;
- it has multiple-interface connectivity with the core network EPC 200 (802.11 technologies, WIMAX, Satellite, etc.);
- it is provided with mobility capability (for example, random mobility or predicted mobility, or controlled mobility).

In particular, a heterogeneous node Het.eNB 30 can comprise:

- a power supply module 40 configured to power the node eNB by using the available resources such as a battery, solar panels, a wind turbine, or any other equivalent resources. This self-powering capability is designed to allow the nodes Het.eNB to support the mobility. The power supply module 40 is further configured to control the energy resources and communicate them to the FME entity;
- a multiple-interface module 41 configured to allow communication between the node Het.eNB 30 and the core network EPC 200 by using a suitable technology such as, for example, IEEE 802.11, a satellite or Ethernet communication link (standard interface); and
- a mobility module 42 responsible for the mobility of the nodes Het.eNB. This module is further arranged to provide the exact positions of the nodes Het.eNB by using suitable locating technologies (for example a GPS (Global Positioning System) or any other suitable positioning system).

The FME entity makes it possible to incorporate the heterogeneous nodes Het.eNB 30 in the LTE core network and support the capabilities and the additional mechanisms of the dynamic architecture 300.

Figure 5:
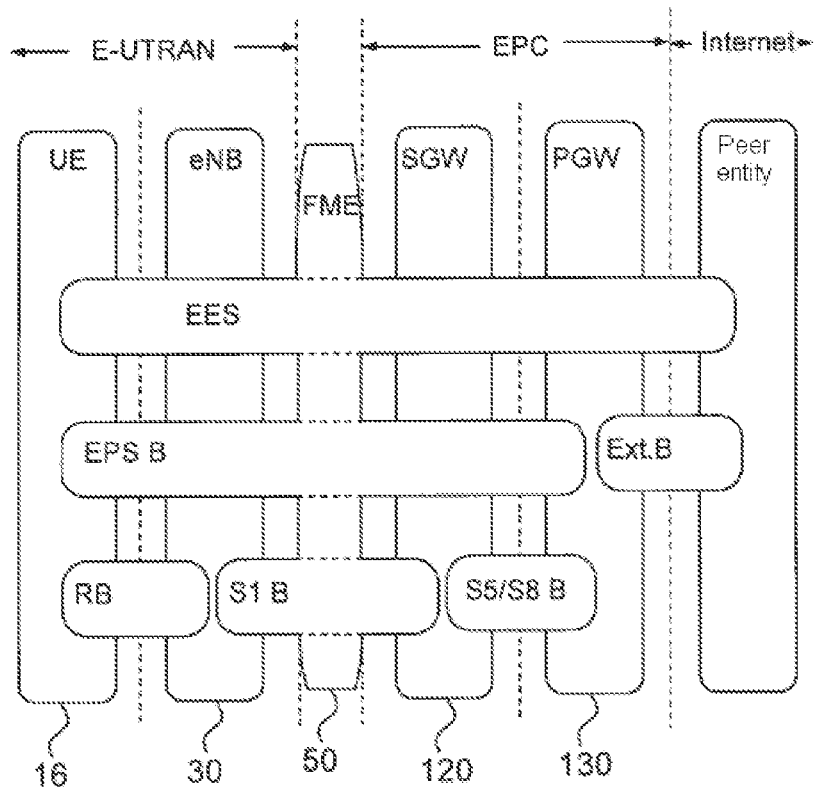
FIG. 5 is a diagram showing the different components of the dynamic architecture according to one embodiment of the invention.

FIG. 5 shows the general structure of the dynamic LTE architecture 300.

As is known per se, the core network EPS (200) requires the establishment of a "virtual" connection between two points of the network (for example between a UE 16 and a gateway PDN-GW 130). This virtual connection is called "EPS Bearer" (designated "EPS B" in the figure). Moreover, a data radio bearer ("radio bearer"), denoted RB in FIG. 5, transports the packets from the EPS bearer between an equipment item UE (16) and a node eNB (30). An interface S1 bearer, denoted S1-B in the figure, transports the packets from the EPS between an eNodeB (30) and a gateway S-GW (120). An interface S1/S8 bearer, denoted S1/S8-B in the figure, transports the packets from an EPS bearer between a gateway S-GW (120) and a gateway PDN-GW (130).

According to a feature of the invention, the dynamic LTE architecture further comprises an entity FME 50 which enables the heterogeneous nodes Het.eNB 30 and the core network 200 to maintain all the standard services and procedures of the LTE network in a transparent manner ("End-to-End service", denoted "EES" in the figure). In particular:

- it makes it possible to incorporate the new network elements in the standard implementation of LTE;
- it makes it possible to incorporate new control mechanisms in the current functions of the standard LTE network, such as supervision, tracking and routing for the network of the nodes Het.eNBs;
- it minimizes the impact of the new network elements and mechanisms on the LTE architecture;
- it implements the new capabilities of the nodes Het.eNB 30, in particular the mobility of the Het.eNBs and their dynamic connectivity with the core network EPC 200, in a manner that is entirely transparent for the core network;
- it controls the dynamic connectivity between a node Het.eNB 30 and the core network EPC 200;
- it ensures the implementation of tunneling for the interface S1 between each node Het.eNB 30 and the core network EPC 200, to allow for the different services offered by the LTE network to be supported.

Figure 6:
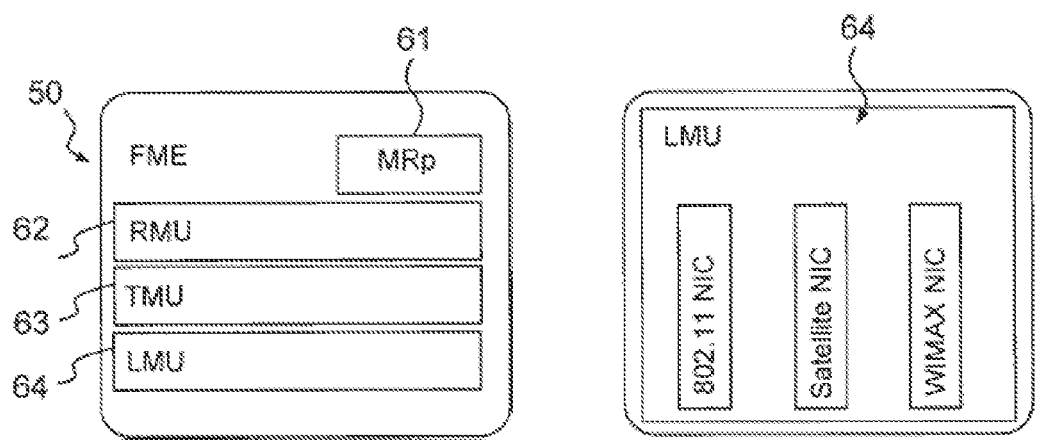
FIG. 6 is a diagram representing the structure of the flexible management entity (FME) according to one embodiment of the invention.

FIG. 6 represents the structure of the flexibility FME management entity 50, according to one embodiment of the invention. The entity FME 50 can take the form of a software and/or hardware entity hosted on a heterogeneous node Het.eNB 30 or alternatively in the core network 200 of the dynamic architecture, and in particular in the entity MME 110. The entity FME 50 according to the invention is configured notably to:

- store metrics associated with the heterogeneous nodes Het.eNB 30;
- control the routing between the network of the nodes Het.eNB and the user equipment 16;
- control the topology of the network of the nodes Het.eNB;
- control the links in the case of multiple-interface connectivity;
- provide core network functionalities and services when a node Het.eNB 30 does not have access to the core network 200,
- control the links for an encapsulation of the interfaces S1 according to the interface used to communicate with the core network EPC 200 (802.11, Satellite, WiMAX),
- create and maintain a virtual interface S1 a, described later.

The entity FME 50 makes it possible to make the new capabilities of the heterogeneous nodes 30 transparent for the core network EPC 200, with minimal impact on the current LTE architecture. Furthermore, the entities FME 50 according to the invention are arranged to balance the energy consumption in the network, which favors the use and prolongs the lifetime of the proposed solution in the dynamic deployments.

As represented in FIG. 6, the entity FME 50 comprises a metrics repository 61, a routing management unit 62 (designated RMU), a topology management unit 63 (designated TMU), and a link management unit 64 (also designated LMU).

The metrics repository 61 is configured to store the metrics of each heterogeneous node 30 in the network and update them by means of exchanges between the heterogeneous nodes Het.eNB. The metrics repository 61 is further responsible for the storage of the information obtained from the power supply module 40 and from the mobility module 41 of the heterogeneous nodes 30 Het.eNBs. It can take the form of a network information server for the other units RMU, TMU and LMU of the FME entity.

The routing management unit 62 (RMU) is configured to route the packets in the network, for any service required for a user equipment item 16 and a heterogeneous node Het.eNB 30, and to keep the routes active between each Het.eNB in the network and the core network EPC (200).

The topology management unit 63 (TMU) is arranged to:
locate each heterogeneous node Het.eNB 30 in the network;
maintain an effective network topology for the Het.eNB network;
control the separation, in terms of geographical distance, between the nodes Het.eNB 30 to avoid any interference between them.

Figure 7:
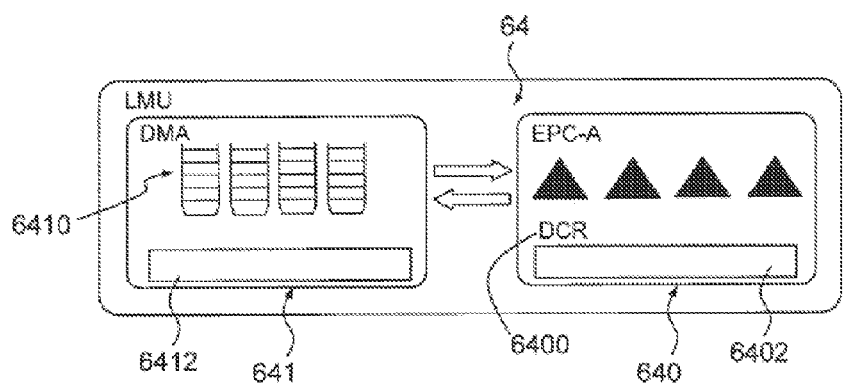
FIG. 7 is a diagram representing the structure of the link unit of the FME, according to one embodiment of the invention.

FIG. 7 represents the structure of the link management unit 64 (LMU). The link management unit 64 is configured to control the MAC and physical layers (PHY) of the interfaces supported to communicate with the core network EPC. It is notably responsible for the encapsulation or the de-encapsulation of all the messages exchanged between the heterogeneous nodes 30 and the core network EPC 200, according to the available technology supported by the nodes Het.eNB to communicate with the EPC. The main effect of this procedure is to create a tunnel between the nodes Het.eNB 30 and the EPC 200. The link management unit 64 thus comprises the following functions:
it maintains the direct dynamic link between the heterogeneous node Het.eNB and the core network EPC;
it performs the encapsulation of the interface S1 in the virtual interface S1a and the extraction of data from the interface S1 encapsulated in the virtual interface S1a;
it creates and maintains a virtual interface S1a (established via one or more Het.eNBs, that is to say by means of a multiple-hop connection).

According to a feature of the invention, the entity FME 50, in particular its unit LMU 64, is configured to support the functionalities of the core network so as to allow the isolated nodes Het.eNBs 30 to have autonomous functionalities to provide connectivity and services to the users. To this end, the unit LMU 64 comprises a network core agent 640 hereinafter called "EPC-A" (acronym for "Evolved Packet Core-Agent"). An isolated node Het.eNB describes a node of Het.eNB type which, at the time considered, is not connected to the core network EPC 200.

In addition, the link management unit LMU 64 can be adapted to support the DTN networks ("Delay/Disruption Tolerant Networks") and the autonomous computation mechanisms by means of a disruption management agent 641, hereinafter called "DMA" (acronym for "Disruption Management Agent").

Since the conventional Ethernet connectivity between a node eNB and the core network EPC is replaced according to the invention by a multiple-interface connectivity on which the capabilities of the new heterogeneous nodes 30 rely, an FME client 51 can be installed in any network element involved in the implementation of this multiple-interface connectivity.

The probability of a frequent link disruption between Het.eNBs-Het.eNBs and Het.eNBs-EPC can be more or less significant in certain scenarios, depending on:
(i) the type of mobility of the nodes eNBs;
(ii) the wireless connectivity between the heterogeneous nodes (Het.eNBs-Het.eNBs) on the one hand, and each heterogeneous node and the core network EPC (Het.eNBs—EPC);
(iii) unpredictable changes in the conditions of the channels.

The virtual interface S1a provided according to the invention can then suffer a temporal disruption affecting the normal operation of the network. For this, mechanisms are introduced into each entity FME 50 such as the DTN mechanism and autonomous mechanisms to avoid the loss of information and therefore the disruption of the services.

These mechanisms are supported by the disruption management agent DMA 641 of the unit LMU 64.

However, it can be difficult to predict the duration of the disruption or of the disconnection because of multiple factors which can affect the stability of the links in the mobile networks. In such scenarios, the node Het.eNB 30 is isolated from the core network EPC 200 for an indeterminate time due to the fragmentation of the network. In the conventional LTE architecture, a number of functionalities in the network are supported by the core network EPC, these functionalities guaranteeing a set of important services which, in particular scenarios, are not totally required.

Advantageously, the unit LMU 64 decides according to (i) the duration of the disruptions or disconnections and (ii) the resources available in the nodes Het.eNBs 30 in terms of memory, of available power and of capabilities, the most effective approach for supporting the DTN mechanism by means of the agent EPC-A 640 or of the agent DMA 641 to guarantee the correct operation of the dynamic LTE network. In particular, in the case where the node Het.eNB suffers long disruptions or disconnections, the agent EPC-A 640 supported by the mechanism of the agent DMA 641 is activated to support the DTN mechanism and maintain specific functionalities and services. In the case where the Het.eNB 30 suffers short disruptions or disconnections, the mechanism of the agent DMA 641 is activated to support the DTN mechanism.

In particular, the agent DMA 641 interacts with the unit LMU 64 to rank the incoming packets according to predefined rules (for example according to the time to live, or TTL, of the packet), and according to the packet type (for example service, signaling, routing packets), and to determine, from this ranking, whether the packet must be stored in a specific buffer memory 6410 or immediately destroyed.

The agent DMA 641 can comprise a buffer memory manager 6412 to control the state of the packets in the different buffer memories, determine whether the packets have an expired TTL or obsolete functionalities, and, if appropriate, reject such packets. The manager 6412 is notably responsible for the local buffer memory space 6410 according to the available memory resources of the node Het.eNB. The agent DMA 641 is also configured to rank and assign priorities to the packets which have to be destroyed when all the memory resources have been used. It is also adapted to send or return the packets according to certain priority rules to the virtual interface S1a as soon as the Het.eNB-Het.eNB or Het.eNB-EPC link is re-established or a new access path to the EPC 200 is found by the routing unit RMU 62.

The agent EPC-A 640 resides in the unit LMU 64 and is configured to control all the mechanisms put in place to sustain the basic functionalities of the nodes Het.eNB 30 isolated following the network fragmentation (or the collapse of the core network EPC 200). The agent EPC-A 640 interacts with the LMU 64 and the agent DMA 641 to guarantee the correct operation of the nodes Het.eNB when disruptions or disconnections occur with the EPC. The agent EPC-A 641 comprises a dynamic code repository 6400 which is used as a protected code runtime environment, in which small functions can be executed when the DMA mechanisms are insufficient (in particular, when the disruption time is greater than a given threshold, requiring updates of the service by the core network EPC 200) to guarantee the correct operation of the isolated Het.eNBs. This technique guarantees that, if a specific server in the core network 200 is temporarily unavailable following disruptions or disconnections, for example of high level, like the short message service center (SMSC) or of low level, like for example AAA, the EPC-A 640 executes a function capable of acting, during the disruption period, as a substitute server. The agent EPC-A 641 further comprises a repository manager 6402 responsible for controlling the dynamic code repository 6400.

This autonomous approach is important and complements the DTN mechanisms in the case where it cannot provide good solutions for the disruption or disconnection problems. In particular, this agent EPC-A 640:
- interacts with the unit LMU 64 to determine the specific functions to be executed to guarantee the correct operation of the isolated nodes Het.eNB 30;
- assigns priorities to the functionalities to be executed for the agent EPC-A 640 according to the required scenarios and the available resources of the isolated nodes Het.eN Bs;
- re-establishes all the functions of the core network EPC as soon as a new access path to the EPC is found by the unit RMU 62 and performs a transfer for all these functions.

The nodes Het.eNB can thus be deployed in a geographically isolated situation, cut off from the core network EPC 200, and while being capable of operating autonomously by virtue of the use of the DMA 641 and/or EPC-A 640 functions both resident in the unit LMU 64 of the Het.eNB.

It should be noted that the complexity of the agent EPC-A 640 depends on the number of functionalities of the core network EPC that it executes.

Figure 8:
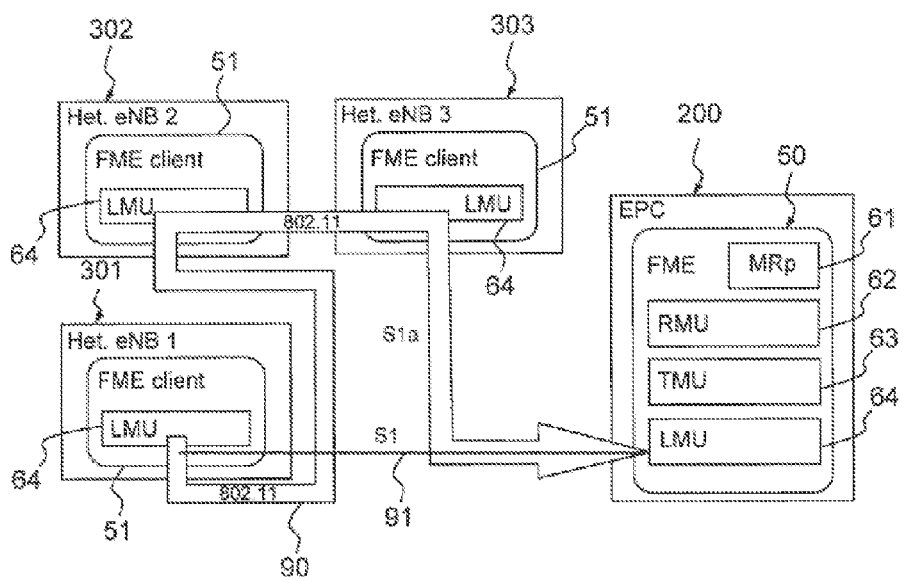
FIG. 8 is a diagram representing an exemplary virtualization of the interface S1.

FIG. 8 represents an example of virtualization of the interface S1 with a node Het.eNB 1 (designated by the reference 301) and the core network 200. The arrow 90 represented in FIG. 8 indicates the multiple-hop route followed by the interface S1a to reach the core network 200. The virtual interface S1a routes all the information from the interface S1 represented by the arrow 91 through the units LMU 64 of the nodes Het.eNB 1 (301), Het.eNB 2 (302), Het.eNB 3 (303) to reach the unit FME 50 in the core network 200. Advantageously, the unit LMU 64 of the core network 200 encapsulates the interface S1 in accordance with the technology available in the node Het.eNB, such as, for example, the 802.11 standard dedicated to wireless networks.

Figure 9:
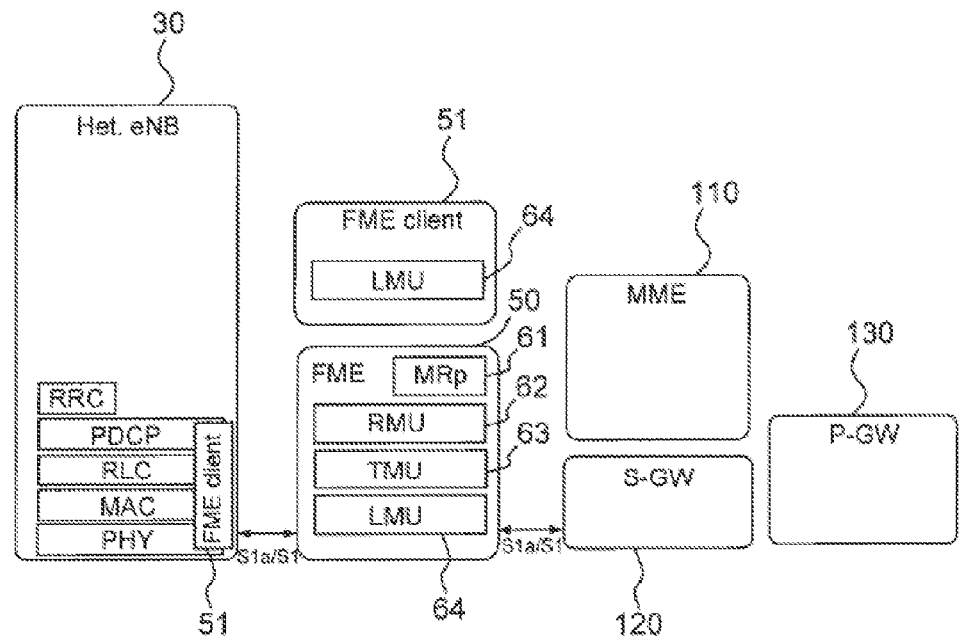
FIG. 9 shows the elements and the interfaces of the FME entity.

FIG. 9 shows the structure of different elements of an exemplary dynamic architecture, and the interfaces S1 and S1a. The architecture of FIG. 9 comprises an FME client 51 located in a node Het.eNB 30, an FME client 51 located outside the Het.eNB, and a complete FME entity 50. An FME client 51 (denoted "FME$_C$") is a reduced version of the FME 50. It supports all the capabilities of the unit LMU 64. The FME client 51 is in permanent communication with the units RMU 62 and TMU 63 of the entity FME 50 for topology and routing maintenance. The FME client is thus a kind of convergence layer between the technologies: it takes over the entire process making it possible to change from the LTE technology to any technology used for communication between the node Het.eNB 30 and the core network EPC 200. The interface S1a is a virtual interface making it possible to the connect isolated node Het.eNB with the entity MME 110 in the control plane or with the serving gateway S-GW 120 in the transfer plane. The interface S1 is encapsulated into the interface S1a to allow interfaces other than Ethernet to be supported and to allow a multiple-hop connection with the core network 200.

In the embodiments of the invention described above, the unit LMU 64 of the FME clients 51 has no routing functionality. The route for S1a is supplied by the unit RMU 62 of the entity FME 50 of the core network EPC 200 for each heterogeneous node Het.eNB. However, the unit LMU 64 of the FME clients 51 knows the next hop on the route. The physical positioning of the entity FME 50 is chosen according to the resources of the heterogeneous nodes Het.eNB. In particular, the entity FME 50 can be located in the core network 200 to have a centralized approach, according to a first embodiment of the invention. In a second embodiment of the invention, the entity FME 50 can be situated in the heterogeneous nodes Het.eNB 30 according to a decentralized approach.

Figure 10:
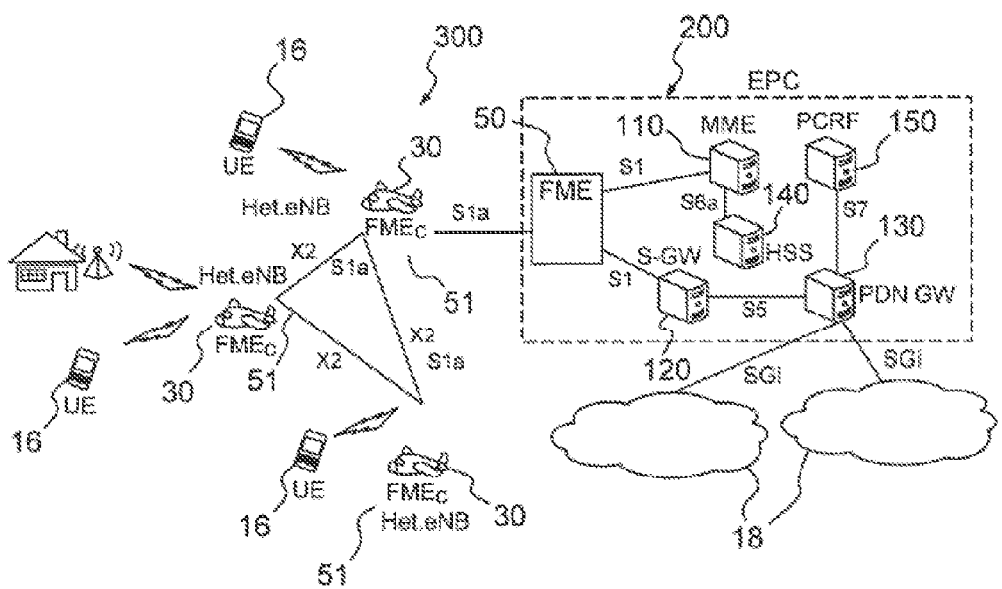
FIG. 10 represents an exemplary dynamic architecture according to a centralized approach.

Reference is made to FIG. 10 which represents an exemplary dynamic architecture according to the first embodiment of the invention (centralized approach).

In this embodiment, the entity FME 50 takes over the capabilities of the heterogeneous nodes Het.eNB 30, in a centralized manner. All the information is collected in the EPC 200 to support all the functionalities of the FME 50. The architecture further comprises a set of FME clients 51 in each heterogeneous node Het.eNB while a single entity FME 50 is installed in the core network EPC 200. Thus, a number of FME clients 51 exist in the network of the heterogeneous nodes Het.eNB.

Figure 11:
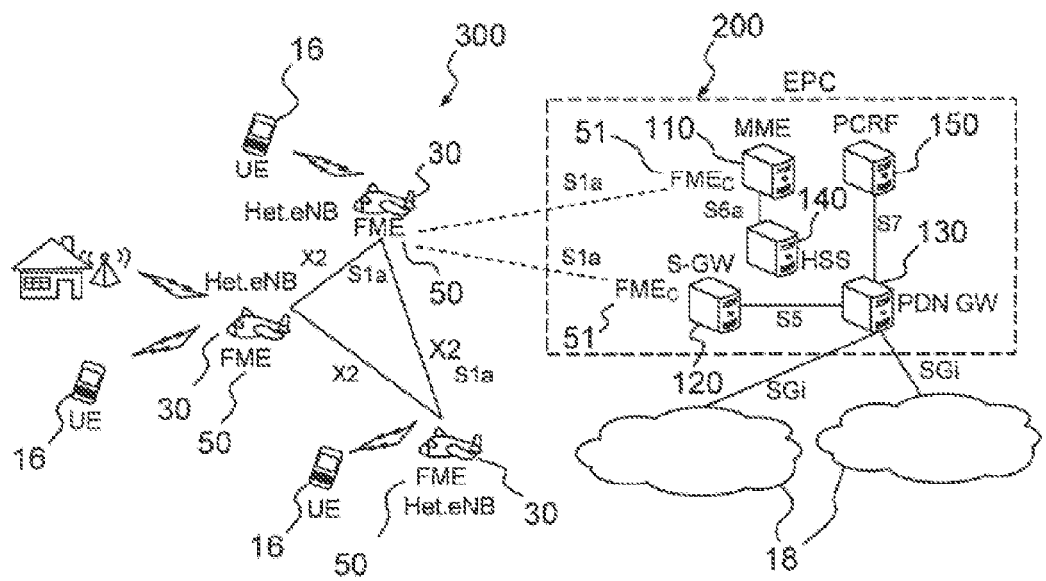
FIG. 11 represents an exemplary dynamic architecture according to a decentralized approach.

FIG. 11 represents an exemplary dynamic architecture according to the second embodiment of the invention (centralized approach).

In this second embodiment of the invention, the network thus comprises more than one entity FME 50 which take over the capabilities of the heterogeneous nodes Het.eNB 30, in a decentralized manner. All the information is collected at each node Het.eNB 30 to support the functionalities of the FME 51 which is installed therein. Moreover, in this embodiment, an FME client 51 (denoted "FME$_C$") is provided in the core network 200 whereas multiple FMEs 50 are provided in the network of heterogeneous nodes 30.

To simplify the understanding of the invention, the term "FME" and the reference 50 will be used to denote both the FME and FME client entities hereinafter in the description. A person skilled in the art will, however, understand that, depending on the case, one or other of the first and second embodiments may apply. Thus, when a central FME entity is provided in the core network 200, FME clients are installed in the nodes Het.eNB 30, and when an FME entity is provided in each node Het.eNB, an FME client is provided in the core network in a decentralized approach.

The invention thus makes it possible for the LTE4G/3GPP network to operate in dynamic environments exposed to disruptions, and notably support the following new capabilities:
- management of the mobility of the nodes eNB;
- flexibility of connectivity between the nodes eNB and the core network EPC (200);
- routing and tracking for a network consisting of mobile nodes eNBs;
- keeping the new capabilities of the nodes Het.eNB transparent, notably the mobility of the nodes Het.eNB 30 and their multiple-interface connectivity with the core network EPC 200;
- encapsulation of the interface S1 between each Het.eNB and the EPC, that is to say the tunneling of all the services managed by the LTE architecture;
- management of the DTN mechanisms by the agent DMA 641 for LTE in a dynamic environment;
- management of communication emanating from the nodes Het.eNBs in the network fragmentation scenarios through the EPC-A 640;

guarantee of a specific set of critical services, even if the node Het.eNB is completely disconnected from the core EPC 200;

facility to integrate new network elements in a standard LTE network architecture.

These capabilities can be implemented, according to the invention, without causing any major disruption to the conventional LTE network architecture to support these new capabilities. Furthermore, the new elements (FME, LMU, RMU, etc.) have a minimal impact on the conventional LTE architecture. New capabilities for the important issues can thus be supported at little cost. It further makes it possible to integrate control, tracking and routing mechanisms for the mobile network of the nodes Het.eNB with the standard LTE network configuration.

Although not limited to such applications, the invention is of particular interest for the deployment of 4G/3GPP LTE wide-band networks for emergency communications, and for a temporary increase in capacity for LTE networks, upon the occurrence of specific events inducing significant application traffic. Similarly, the invention makes it possible to envisage, by virtue of the capacities for standalone operation from an energy point of view of the Het.eNBs, putting in place an LTE coverage that is reliable and insensitive to any failures of the global electrical network.

The next part of the description will be given with reference to emergency communication scenarios, by way of nonlimiting example, to illustrate the process of creating and maintaining a virtual interface S1 for a unit FME 50.

Figure 12:
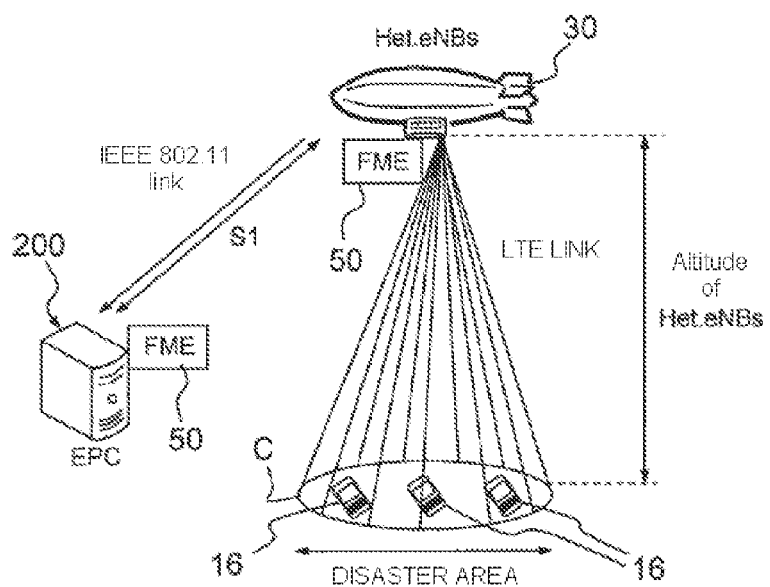
FIG. 12 is a diagram representing an exemplary dynamic architecture, according to a first scenario.

FIG. 12 represents a first scenario relative to a dynamic LTE network architecture for a single node Het.eNB. In this scenario, a single node Het.eNB 30 is deployed in the disaster zone to provide the users with comprehensive services. The node Het.eNB is equipped with an entity FME denoted FME(1). A complementary FME entity (complete FME or FME client depending on the approach chosen) is also provided in the core network EPC. The FME entity of the EPC is denoted FME(2).

Figure 13:
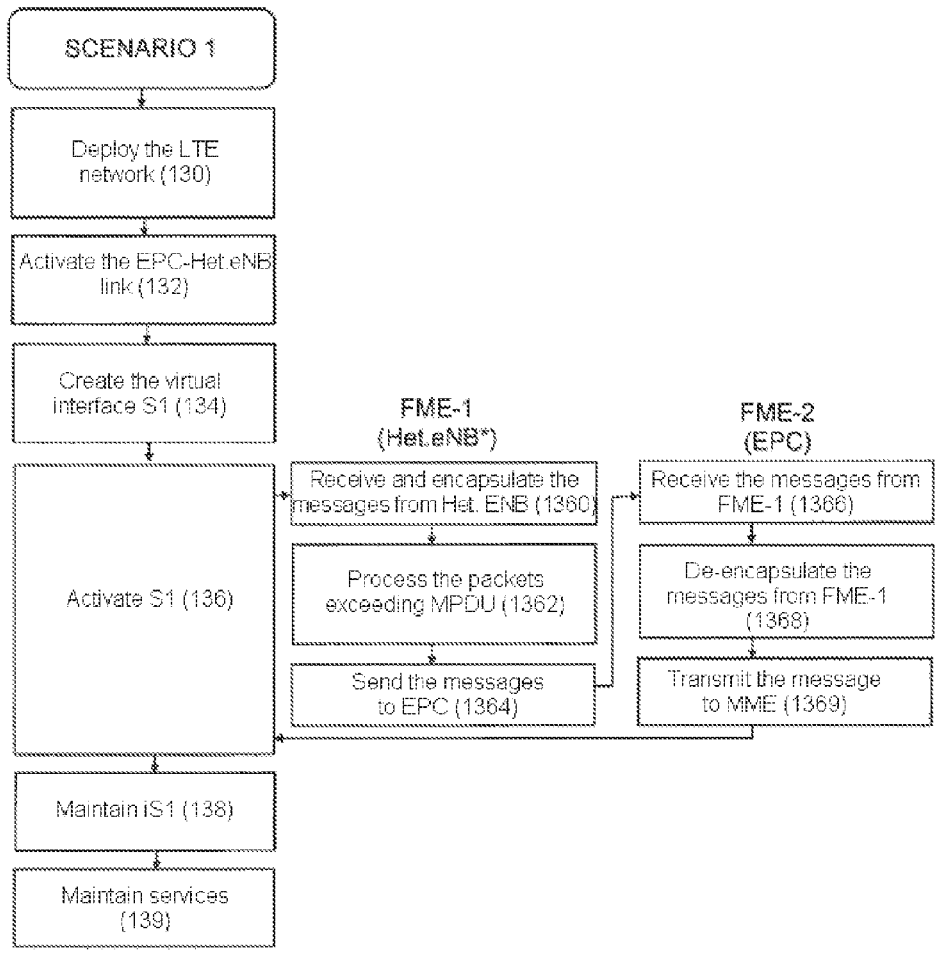
FIG. 13 is a flow diagram representing the steps implemented to cover a disaster area according to the first scenario.

FIG. 13 represents the method implemented to maintain the services, according to this first scenario.

In the step 130, the LTE network is deployed in the disaster zone. In order to provide all the services for the coverage area, the network comprises an MME unit 110 with a wireless interface. For example, an MME unit provided with an IEEE 802.11 interface and a node Het.eNB 30 provided with two LTE and IEEE 802.11 wireless interfaces are deployed.

In the step 132, the link is then activated between the core network 200 and the node Het.eNB 30 (EPC-Het.eNB link) for the communications: the entity FME(1) 50 establishes the communication link between the node Het.eNB 30 and the core network EPC 200 (creation of a point-to-point link). The entity FME(1) 50, in particular its unit LMU (64), configures the IEEE 802.11 interfaces in Ad-Hoc mode and chooses the appropriate transmission power for the IEEE 802.11 interfaces in the EPC 200 and the node Het.eNB, according to the distance between the two components.

In the step 134, the virtual interface is created: once the EPC-Het.eNB link is established, the unit LMU 64 creates the virtual interface of S1. In particular, the unit LMU 64 defines all the parameters required for the encapsulation with the IEEE 802.11 standard, and for all the traffic coming from LTE to EPC and vice versa. The main parameters required comprise the identification address of the IEEE 802.11 interface in the node Het.eNB 30 and the EPC 200, and the maximum packet length permitted by the IEEE 802.11 standard (MPDU).

In the step 136, the virtual interface S1a is operational. When the node Het.eNB has to connect to the EPC 200, the following steps are carried out:

a. the messages originating from the node Het.eNB 30 to be routed over the interface S1 are checked and encapsulated in an IEEE 802.11 standard packet (step 1360 by the entity FME(1));

b. if the message is larger than the authorized maximum length MPDU, the entity FME (1) controls the fragmentation/aggregation of the message (step 1362);

c. the unit LMU 64 then transmits the message to the EPC 200 according to the procedure of the MAC layer standards of IEEE 802.11 (step 1364);

d. when the entity EPC receives the message (step 1366), and more specifically the entity FME(2), the entity FME (2) de-encapsulates the message from the IEEE 802.11 standard packet (step 1368), and delivers it to the entity MME 110 (step 1369).

In the step 138, the virtual interface S1a is supervised: the unit TMU 63 controls the availability of the Het.eNB-EPC link to guarantee the interface S1.

In the step 139, the services are maintained. Since the interface S1 is available, comprehensive services can be supplied in the coverage area.

In a second scenario relative to a dynamic LTE network architecture for an isolated node Het.eNB, the node of the first scenario is not linked to the EPC network: partial services are supplied such as calls and text messages between the users located in the coverage area of the node Het.eNB 30. These services are maintained by using the capabilities of the agent EPC-A 640 implemented in the unit LMU 64.

Figure 14:
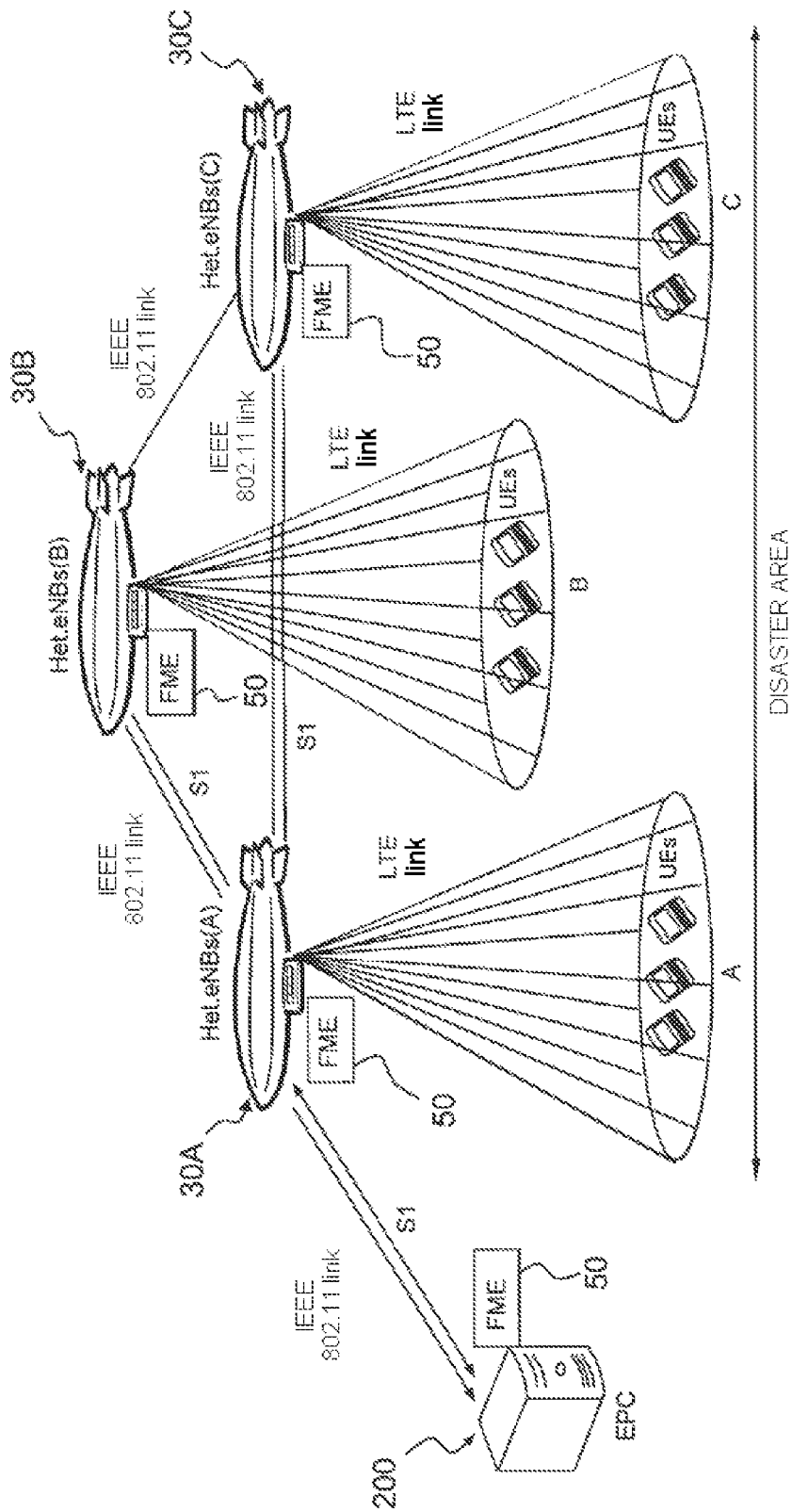
FIG. 14 is a diagram representing an exemplary dynamic architecture, according to a third scenario.

FIG. 14 represents a third scenario relative to a dynamic LTE network architecture for a plurality of nodes Het.eNB 30. In this scenario, several nodes Het.eNBs are deployed in the disaster zone to provide comprehensive services to the users. FIG. 14 shows in particular a first node Het.eNB designated by the reference 30A, having a coverage area A, a second node Het.eNB designated by the reference 30B, having a coverage area B, and a third node Het.eNB designated by the reference 30C and having a coverage area C. The nodes Het.eNB are linked two by two by means of an IEEE 802.11 link. Each node Het.eNB is equipped with an FME entity denoted FME(1). A complementary FME entity (complete FME or FME client depending on the approach chosen) is also provided in the core network EPC. The FME entity of the EPC is denoted FME(2).

Figure 15:
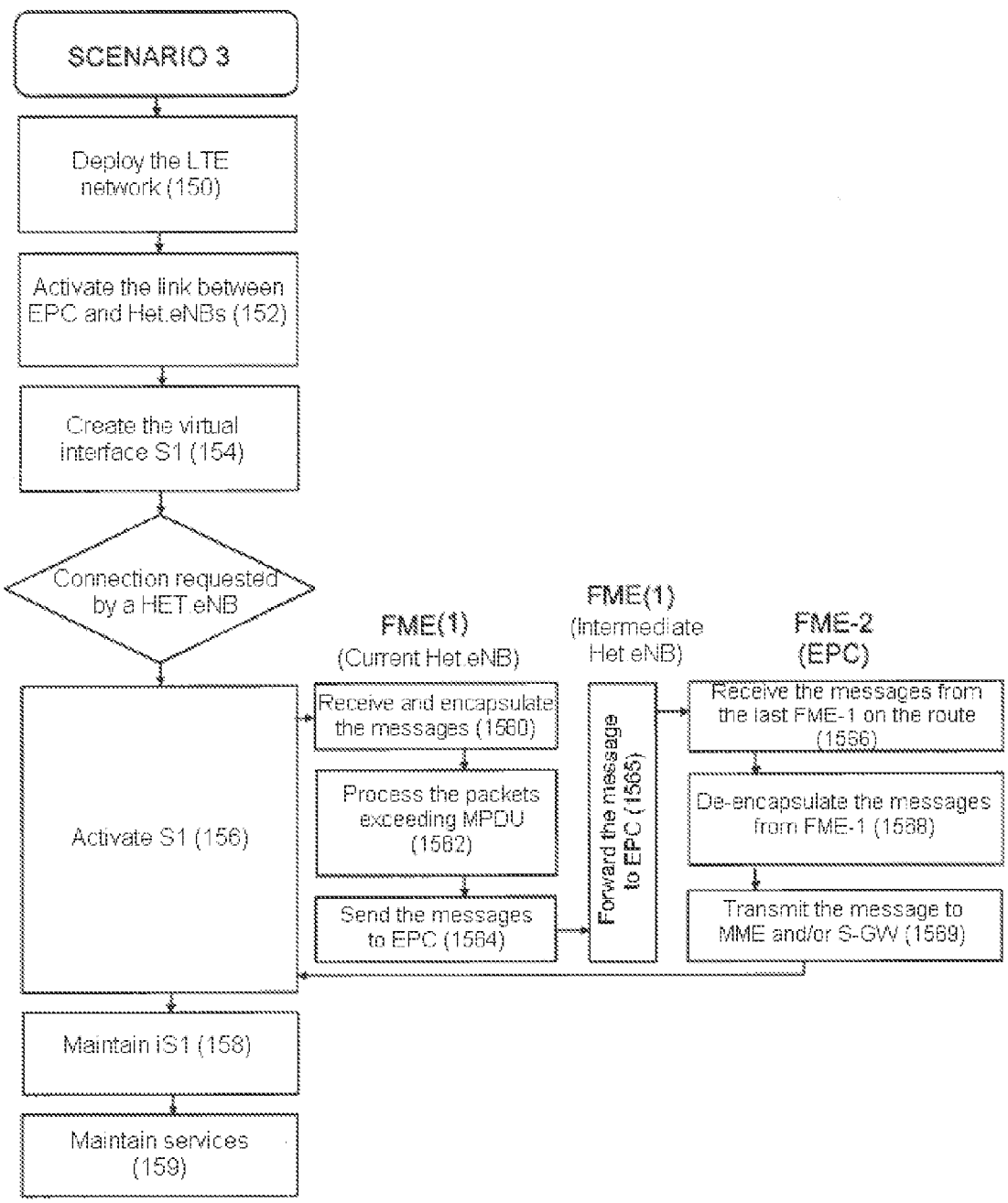
FIG. 15 is a flow diagram representing the steps implemented to cover a disaster area according to the third scenario.

FIG. 15 represents the method implemented to maintain the services, according to this third scenario.

In the step 150, the network is deployed in the disaster zone. In order to provide all the services for the coverage area, the network comprises a unit MME 110 with a wireless interface. For example, a unit MME provided with an IEEE 802.11 interface and the nodes Het.eNB 30A, 30B and 30C, each provided with two LTE and IEEE 802.11 wireless interfaces, are deployed.

In the step 152, the links are then activated between the core network 200 and each node Het.eNB 30A, 30B and 30C. The entity FME 50 establishes the communication link between the nodes Het.eNB 30A, 30B and 30C and the core network EPC 200 (creation of a point-to-point link), according to the topology of the network. In the example of FIG. 14, the topology is a multiple-hop topology made up of point-to-point links: the node 30A is one hop from the EPC 200, the nodes 30B and 30C are two hops from the EPC 200, the node 30A acting as relay between the EPC 200 and the nodes 30B/30C. The links are thus activated between the EPC 200 and the node 30A, between the node 30A and the node 30B, and between the node 30A and the node 30C. The entity FME 50, in particular its unit LMU (64), configures the IEEE 802.11 interfaces in Ad-Hoc mode and chooses the appropriate transmission power for the IEEE 802.11 interfaces in the EPC 200 and each node Het.eNB, depending on the distance between the two components.

In the step 154, a virtual interface S1a is created: once the links between the EPC and the nodes Het.eNBs (30A, 30B, 30C) are established, the unit LMU 64 creates the virtual interface of S1. In particular, the unit RMU 62 creates the routes leaving from each node Het.eNB to the EPC, and notifies the unit LMU 64 of these routes. The routes can be created by using standard MANET (Mobile Ad hoc NETworks) routing protocols or, as a variant, specific protocols. Furthermore, the unit LMU 64 defines all the parameters required for the encapsulation with the IEEE 802.11 standard. The main parameters required comprise the identification address of the IEEE 802.11 interface in the node Het.eNB 30 and the EPC 200, and the maximum packet length authorized by the IEEE 802.11 standard (MPDU).

In the step 156, the virtual interface S1a is operational. This step comprises the following steps, when the node Het.eNB communicates with the EPC 200:

a. the messages originating from a node Het.eNB 30 to be routed over the interface S1 are checked and encapsulated in an IEEE 802.11 standard packet by the FME entity of the node Het.eNB considered (step 1560);
b. if the message is larger than the authorized maximum length MPDU, the FME entity of the node Het.eNB implements the fragmentation/aggregation of the message (step 1562);
c. the unit LMU 64 of the node Het.eNB then transmits the message to the next hop of the route (via another Het.eNB if appropriate) according to the procedure of the MAC layer standards of IEEE 802.11 (step 1564);
d. if the next element of the route corresponds to another node Het.eNB, the unit LMU of this node forwards the message to the EPC, in accordance with the determined route (step 1565);
e. when the entity EPC receives the message (1566), and more specifically its entity FME 50, the FME entity of the EPC de-encapsulates the message from the IEEE 802.11 standard packet (1568), and delivers it to the entity MME 110 or to the gateway S-GW 120 (step 1569).

In the step 158, the virtual interface S1a is supervised: the unit TMU 63 controls the availability of each Het.eNB-EPC link to guarantee the interface S1, whereas the unit RMU 62 permanently updates and maintains the routes.

In the step 159, the services are maintained: since the interface S1 is available, comprehensive services can be provided in the coverage area.

In a fourth scenario relative to a dynamic LTE network architecture for a plurality of isolated nodes Het.eNB 30, none of the nodes of the third scenario is linked to the network EPC 200. A virtual interface S1 a is maintained between the heterogeneous nodes 30A, 30B and 30C for the units LMU 64. In as much as this scenario does not assume any connectivity, however intermittent, with a core network EPC 200, this approach is decentralized to avoid non-degraded operation. The unit RMU 62, located in the FMEs of the nodes Het.eNB 30A, 30B and 30C, is responsible for creating the routes between the nodes. These virtual interfaces S1a are used to provide partial services in the coverage area.

As in the second scenario, partial services are provided such as calls and text messages between the users located in the coverage area of the nodes Het.eNB 30A, 30B and 30C. These services are maintained by using the capabilities of the agent EPC-A 640 implemented in the unit LMU 64.

The above scenarios can also be combined.

The invention is not limited to the embodiments described above by way of nonlimiting example. It encompasses all the variant embodiments which will be able to be envisaged by a person skilled in the art. In particular, the invention is not limited to the scenarios described by way of example, and can include a combination of these scenarios or even other scenarios. Furthermore, the invention is not limited to the applications described. It can notably be applied in different phases during or after a disaster or an emergency situation such as:

An emergency response phase
A restoration and repair phase
A reconstruction of the destroyed infrastructure for functional replacement
A reconstruction for redevelopment.

The invention offers numerous advantages in such situations, notably:

a dynamic deployment: the heterogeneous nodes Het.eNB 30 can be easily positioned in the disaster zone to have more cells and coverage area;
an incremental deployment: this service can perhaps be supported initially with a single heterogeneous node Het.eNB then the network can be expanded progressively with several nodes Het.eNBs if additional coverage and/or capabilities are necessary;
a low cost: a small set of nodes Het.eNBs proves less costly than a geostationary satellite solution; furthermore, a network of Het.eNBs proves less costly than the deployment of a terrestrial network with a large number of base stations;
a flexibility to respond to the traffic needs: the inclusion of the mobility of the eNBs makes it possible, depending on the requirements of the cases of use considered, to adapt the radio coverage of the eNBs by a simple geographic displacement of the eNBs. In the case where the eNBs are deployed on airborne platforms, these eNBs can for example have a greater radio coverage on the ground simply by gaining altitude and can reduce this radio coverage by losing altitude. This approach of variation of the radio coverage by geographic displacement of the eNBs complements the traditional approaches (for example via the variation of the transmission gains on the antennas of the eNBs or the use of advanced antennas of "smart antenna" type, capable of adapting their radio coverage on the ground) and adds an extra element of flexibility; and
a rapid deployment: for a given network architecture, it is possible to deploy a new node Het.eNB relatively quickly.

A person skilled in the art will understand that the FME entity and its sub-components can be implemented in various ways by hardware, software, or a combination of hardware and software.

In particular, the components of the FME unit can be combined or separated into sub-elements to implement the invention. Furthermore, they can be implemented in the form of computer programs executed by a processor. A computer program is a set of instructions which can be used, directly or indirectly, by a computer.

A computer program can be written in any programming language, including the compiled or interpreted languages, and it can be deployed in any form in the chosen IT environment.

The invention claimed is:

1. A communication network comprising a packet core network and at least one wireless access node, arranged to provide the packet core network with access to user equipment via a first interface established between the access node and a network element of the core network, wherein said network comprises at least one flexibility management entity configured to establish a second virtual interface passing through the flexibility management entity, said second virtual interface linking the access node and the network element, and said first interface being encapsulated in said second virtual interface,
wherein the flexibility management entity comprises a link management entity configured to control a MAC and physical layers of the supported interfaces to communicate with the core network, and to encapsulate/de-encapsulate messages exchanged between the access node and the network element, the link flexibility management entity comprising a disruption management agent for controlling the service disruptions and the disconnections, the disruption management agent being configured to store in memory packets incoming into an access node, selected according to predefined rules, said disruption management agent being further configured, in response to the re-establishment of the link between an access node and a network element following a network service disruption or disconnection, to send some of the packets stored in memory to said network element.

2. The communication network as claimed in claim 1, further comprising a flexibility management entity in the core network and a client flexibility management entity in each access node.

3. The communication network as claimed in claim 2, wherein an activation of the virtual second interface comprises the encapsulation of the message in a packet by the flexibility management entity of said access node, and a transmission of said packet to the flexibility management entity of the packet core network according to a determined route, the packet being intercepted and returned by each flexibility management entity of the intermediate access nodes on the route.

4. The communication network as claimed in claim 1, wherein the flexibility management entity comprises a metrics repository suitable for storing metrics for each access node in the network and for updating them by means of exchanges between the access nodes.

5. The communication network as claimed in claim 1, wherein the flexibility management entity comprises a routing management entity configured to determine a route for each message exchanged between an access node and said network element.

6. The communication network as claimed in claim 1, wherein the flexibility management entity comprises a topology management entity arranged to control the topology of the network.

7. The communication network as claimed in claim 1, wherein the link management entity further comprises a core network agent suitable for at least partially replacing an element of the core network, in case of unavailability of said element of the core network following disruptions or disconnections.

8. The communication network as claimed in claim 1, further comprising a mobility control entity in each access node and a client mobility control entity in the core network.

9. The communication network as claimed in claim 1, wherein the communication network is a LTE based network, and the network element comprises at least one of the following: a LTE Mobility Management Entity and a LTE serving gateway.

10. A wireless access node having a given coverage area, arranged to provide access to user equipment located in said coverage area, wherein said access node is able to move and comprises a flexibility management entity configured to establish a link between said mobile access node and an element of a communication network via a first interface established between the access node and said network element, the flexibility management entity being further configured to establish a second virtual interface passing through the flexibility management entity, said second virtual interface linking the access node and the network element, the first interface being encapsulated in said second virtual interface,
wherein the flexibility management entity comprises a link management entity configured to control a MAC and physical layers of the supported interfaces to communicate with the core network, and to encapsulate/de-encapsulate messages exchanged between the access node and the network element, the link flexibility management entity comprising a disruption management agent for controlling the service disruptions and the disconnections, the disruption management agent being configured to store in memory packets incoming into an access node, selected according to predefined rules, said disruption management agent being further configured, in response to the re-establishment of the link between an access node and a network element following a network service disruption or disconnection, to send some of the packets stored in memory to said network element.

11. The access node as claimed in claim 10, wherein said network element is an element of the packet core network of the communication network.

12. The access node as claimed in claim 11, wherein said access node is an isolated node and in that said network element is another access node isolated from the communication network.

13. The access node as claimed in claim 10, further comprising a multiple-interface module configured to allow communication between the access node and the core network of said communication network, according to a suitable technology.

14. The access node as claimed in claim 10, wherein each access node further comprises a mobility module configured to provide the positions of the mobile node according to a suitable locating technology.

15. A method for the deployment of a communication network, in a given coverage area, comprising a packet core network and at least one wireless access node arranged to provide the core network with access to user equipment of the coverage area via a first interface established between the access node and a network element of the core network, comprising:
providing at least one flexible management entity in the network;
activating the link between the core network and the wireless access node according to the topology of the network;
creating a second virtual interface passing through said flexible management entity, said second virtual interface linking the access node and the network element, and said first interface being encapsulated in said second virtual interface, wherein the flexibility management entity comprises a link management entity configured to control a MAC and physical layers of the supported interfaces to communicate with the core network, and to encapsulate/de-encapsulate messages exchanged between the access node and the network element, the link flexibility management entity implementing a step of controlling the service disruptions and the disconnections, said step of controlling the service disruptions and the disconnections comprising storing in memory packets incoming into an access node, selected according to predefined rules, and, in response to the re-establishment of the link between an access node and a network element following a network service disruption or disconnection, sending some of the packets stored in memory to said network element.

* * * * *